United States Patent [19]
Kuno et al.

[11] Patent Number: 4,771,307
[45] Date of Patent: Sep. 13, 1988

[54] AUTOMATIC FOCUSING SYSTEM FOR USE IN CAMERA

[75] Inventors: Osamu Kuno; Yasuo Nishida; Tsuneo Tani, all of Tokyo, Japan

[73] Assignee: Sony Corporation, Tokyo, Japan

[21] Appl. No.: 17,219

[22] Filed: Feb. 20, 1987

[30] Foreign Application Priority Data

Apr. 25, 1986 [JP] Japan .................................. 61-096493

[51] Int. Cl.$^4$ .......................... G03B 3/00; G02B 5/28; H04N 5/781
[52] U.S. Cl. ...................................... 354/403; 350/1.6; 350/166; 350/311; 358/227; 358/906; 358/909; 354/419
[58] Field of Search ...................... 354/403, 415, 419; 350/1.6, 1.7, 311, 163-166, 316; 358/227, 906, 909

[56] References Cited

U.S. PATENT DOCUMENTS

| | | | |
|---|---|---|---|
| 4,229,066 | 10/1980 | Rancourt et al. | 350/1.6 |
| 4,536,072 | 8/1985 | Taniguchi et al. | 354/403 |
| 4,549,801 | 10/1985 | Winter | 354/403 |
| 4,571,047 | 2/1986 | Hirai | 354/403 |
| 4,616,902 | 10/1986 | Nagai | 350/1.6 X |

FOREIGN PATENT DOCUMENTS

0204646 10/1986 European Pat. Off. .
1524587 7/1978 United Kingdom .

Primary Examiner—W. B. Perkey
Attorney, Agent, or Firm—Ronald P. Kananen

[57] ABSTRACT

An automatic focusing system includes a photo-sensitive element for receiving light passing a main lens system of a camera. The photo-sensitive element produces a distance indicative signal based on the received light. The main lens system is driven to a position to focus upon an object on the basis of the distance indicative signal from the photo-sensitive element. The system is also provided with an auxiliary light generating element for emitting an auxiliary light to the object. The auxiliary light generating element is activated while distance measurement is performed for focusing operation in order to enable the automatic focusing system to perform a distance measurement and focus upon the object even in dark environmental conditions or upon dark objects. The auxiliary light generating element may be selected to emit an infrared light beam or a far infrared light beam.

30 Claims, 3 Drawing Sheets

FILTER CHARACTERISTICS

AUTOMATIC FOCUSING SYSTEM FOR USE IN CAMERA

BACKGROUND OF THE INVENTION

1. Field of the Invention

The present invention relates generally to an automatic focusing system for cameras. More specifically, the invention relates to an automatic focusing system which can accurately measure the distance between the camera and the object to be focused upon under all environmental conditions and for all object brightnesses. Further particularly, the invention relates to an automatic focusing system applicable for still cameras, such as electronic cameras, for example.

2. Description of the Background Art

In recent years, various automatic focusing systems for cameras have been developed for automatically measuring distance between the cameras and objects to be focused upon and operating focusing lens at positions corresponding to the measured distance for focusing at the object. Such automatic focusing systems are useful in various cameras, such as electronic still cameras and so forth, for eliminating the need for operators of the cameras to focus them.

As is well known, basically two different types of automatic focusing systems have been developed. One of the systems is known as an "active type automatic focusing system" which transmits an infrared light beam or ultra sonic wave toward the object to be focused upon and receives the reflected beam or wave for measuring the distance from the camera to the object by measuring elapsed time from transmission to receipt. The other type of system is known as a "passive type automatic focusing systems" which delects environmental light reflected by the object for deriving the focusing lens position based thereon. As may easily be appreciated, the active type automatic focusing system requires an infrared light beam generating means or ultra an sonic wave generating means for transmitting the light beam or ultra sonic wave toward the object. On the other hand, since the passive type automatic focusing systems are not required to facilitate any light beam or ultra sonic wave generator, the construction of these systems is much simpler than that of the active type automatic focusing system. Also, the passive type automatic focusing systems are known to require less electric power than the active type systems. Among various passive type automatic focusing systems, so-called TTL (through the lens) systems are known to be useful because they are subject to no parallax in focusing.

On the other hand, the passive type automatic focusing system tends to have difficulty in focusing upon relatively dark objects, since light intensity received from dark objects tends to be insufficient for performing automatic focusing operations. Therefore, when the environmental condition in picking up an image of the object or taking a picture requires strobe light or flash light, it is practically impossible to perform automatic focusing operations by means of passive type automatic focusing systems, before the strobe light is emitted. Therefore, the passive type automatic focusing system is indeed useless in focusing in dark environmental conditions or for focusing upon dark objects.

SUMMARY OF THE INVENTION

It is an object of the present invention to provide a novel and useful automatic focusing system which has a simple construction comparable with that of the passive type automatic focusing system but which can perform distance measurement even in dark environmental conditions or with respect to dark objects.

Another object of the invention is to provide a TTL type automatic focusing system which can perform measurements of the distance from the camera to the object even in dark environments or upon substantially dark objects.

In order to accomplish the aforementioned and other objects, an automatic focusing system, according to the invention, includes a photo-sensitive element for receiving light passing through a main lens system of a camera. The photo-sensitive element produces a distance indicative signal based on the received light. The main lens system is driven to a position to focus upon an object on the basis of the distance indicative signal from the photo-sensitive element. The system is also provided with an auxiliary light generating element for emitting an auxiliary light on the object. The auxiliary light generating element is activated while distance measurements are being performed for focusing operations in order to enable the automatic focusing system to perform distance measurements and focus upon the object even in dark environmental conditions or upon dark objects.

In the preferred embodiments, the auxiliary light generating element is selected to emit an infrared light beam or a deep infrared light beam.

According to one aspect of the invention, an automatic focusing system for a camera which includes a main lens system having a focusing lens movable with respect to another lens for focusing the main lens system upon the object, a primary light source for illuminating the object for enabling the camera to pick-up an image of the object, comprises a servo system associated with the movable lens of the main lens system for shifting the position of the movable lens according to a distance indicative signal indicative of the distance between the camera and the object, a photosensing means for receiving light reflected from the object and deriving the distance to produce the distance indicative signal, a distance measurement light source means active when the primary light source means is active, for irradiating a distance measuring light onto the object, reflected light receiver means for receiving the light reflected by the object and passing the reflected light to the photosensing means, and a filter means, disposed between the reflected light receiver means and the photosensing means for filtering out a light component of a predetermined wavelength range, the filter means being formed so as to provide a first pass-band in the range of human vision and a second pass-band corresponding to the wavelength range of the distance measuring light so that the filter means passes the light component in the first pass-band while the distance measurement light source means is held deactivated, and passes the light component in the second pass-band while the distance measuring light source means is active.

Preferably, the photosensing means is most sensitive to light in the second pass-band wavelength range. Thus, the photosensing means may have a sufficiently high sensitivity to the reflected light from the object in the second pass-band so as to assure detection of the distance measuring light. On the other hand, the distance measurement light source means emits distance measuring light which has a wavelength longer than or equal to that of infrared light.

In the preferred construction, the filter means comprises a single filter formed so as to provide the first and second pass-bands. The filter comprising a transparent base having a first light refraction index, a first layer formed on the base and having a second greater refraction index, and a second layer formed on the base and having a third smaller refraction index. Preferably, the first and second layers are formed on the base in the form of a laminate. The first and second layers are laminated on the base by deposition.

The reflected light receiver means comprises the main lens system and means for splitting received light to focus a first component onto an imaging device of the camera and feed a second component to the photosensing means through the filter means. The primary light source means and the distance measurement light source means are enabled and disabled by means of a switching means which has a switch variable position between an enabling position and a disabling position depending upon environmental light intensity around the object and/or brightness of the object. The primary light source means and the distance measurement light source are activated in response to an image pick-up operation of the camera, and the distance measurement light source is activated in advance of activation of the primary light source means.

In the alternative, the primary light source means and the distance measurement light source means are enabled and disabled by means of a switching means which has a switch variable between an enabling position and a disabling position depending upon environmental light intensity around the object and/or brightness of the object, the primary light source means is cooperative with a shutter of the camera for synchronous operation with the latter, and the distance measurement light source is activated in response to an image pick-up operation of the camera in advance of opening of the shutter.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the shown embodiment but are for explanation and understanding only.

In the drawings.

DESCRIPTION OF THE PREFERRED EMBODIMENT

Figure 1:
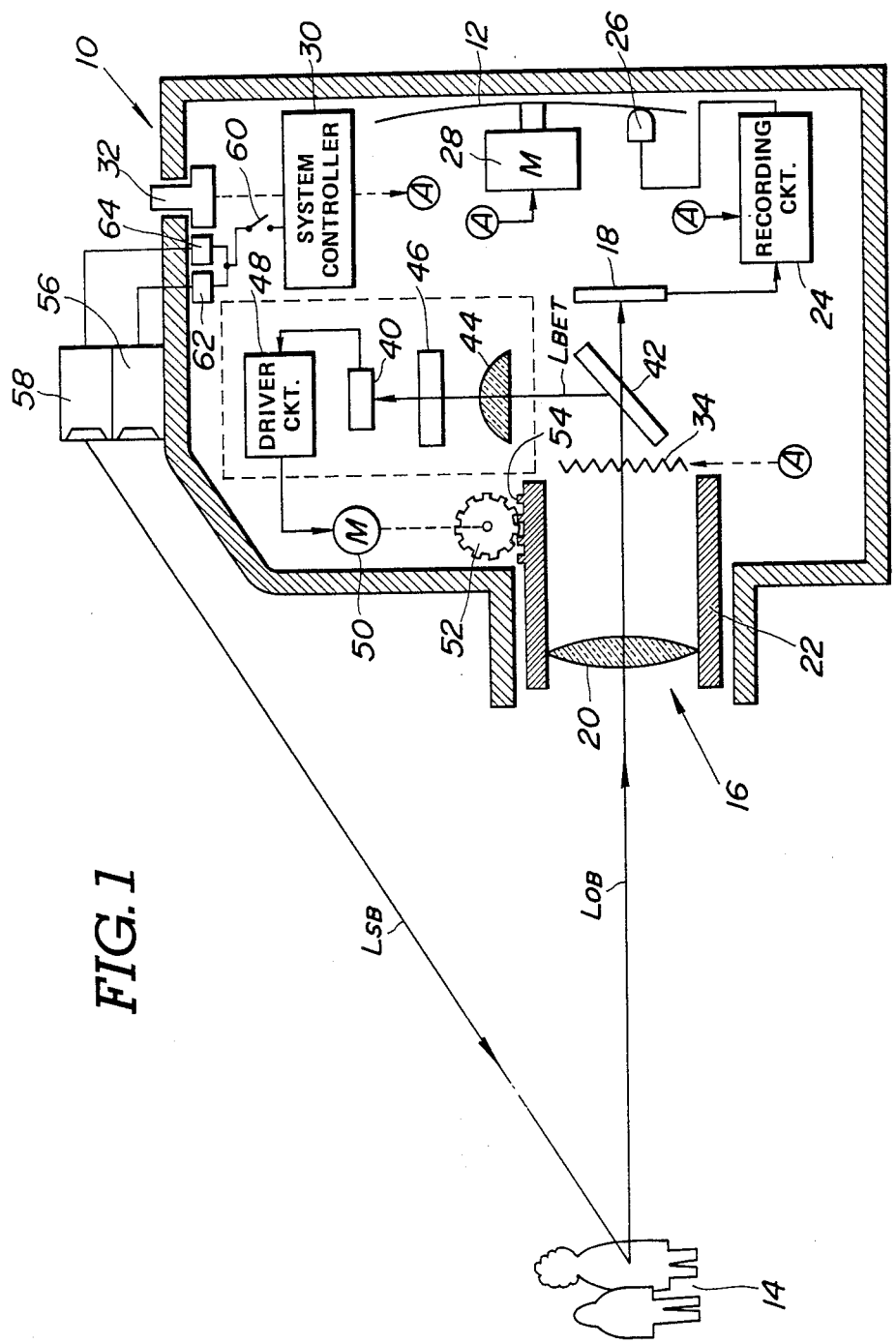
FIG. 1 is a diagramatic illustration of the preferred embodiment of an automatic focusing system according to the present invention, which automatic focusing system is applied to an electronic still camera.
Figure 2:
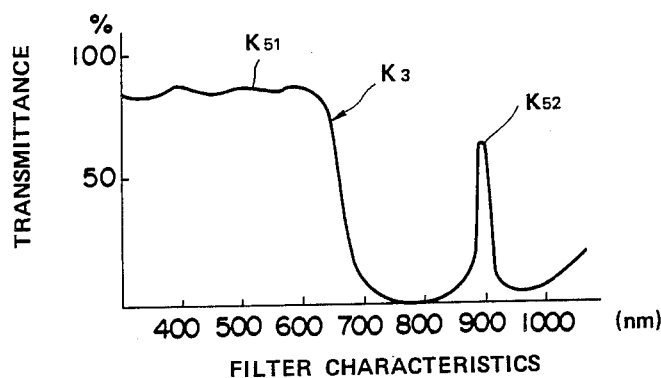
FIG. 2 is a graph showing characteristics of a filter employed in the preferred embodiment of the automatic focusing system of FIG. 1.

Referring now to the drawings, particularly to FIG. 1, the preferred embodiment of an automatic focusing system is incorporated in an electronic still camera 10.

The electronic still camera 10 is designed for recording image data on recording tracks of a magnetic disc 12. For picking-up the image of an object 14, the camera 10 is provided with a main lens system 16 and an image pick-up device 18. The main lens system 16 includes a focusing lens 20 mounted in an annular barrel 22. As is well known, the annular barrel 22 carrying the focusing lens 20 of the main lens system 16 is movable in the axial direction for focusing the image of the object 14 on the image pick-up device 18. The image pick-up device 18 may be formed of a charge coupled device (CCD) having image pick-up elements, for example, and is adapted to produce an image signal. The image signal is processed in a recording circuit 24. The recording circuit 24 processes the image signal from the image pick-up device 18 and writes the image data derived from the image signal on one of the recording tracks on the magnetic disk 12 by means of a magnetic head 26. As is well known, the magnetic disk 12 is driven by a disk drive motor 28 for enabling the image data to be recorded thereon through the magnetic head 26.

A microprocessor based system controller 30 is provided for controlling the image pick-up operation, and the image data recording operation and so forth. The system controller 30 is triggered with a shutter button 32 to perform an image pick-up operation in response to depression of the shutter button 32. The system controller 28 controls a position of a shutter 34 interposed between the main lens system 16 and the image pick-up device 18. Also, the system controller 30 controls operation of the recording circuit 24 for controlling read-/write timing of the image data and so forth. Furthermore, the system controller 30 controls operation of the disk drive motor 28.

Such electronic still cameras have been disclosed in the British Patent First Publication No. 1,112,603, published on July 20, 1983, the European Patent First Publication No. 01 86 883 and the European Patent First Publication No. 02 04 646, for example. The disclosures of the aforementioned publications are herein incorporated by reference for the sake of disclosure.

The preferred embodiment of the automatic focusing system is employed in the aforementioned electronic still camera 10 for deriving distance to the object 14 and axially shifting the focusing lens 20 with the annular barrel 22 for focusing the main lens system 16 upon the object. The automatic focusing system employs a TTL system for receiving a light beam reflected from an object 14 through a main lens system 16 of the camera 10. The automatic focusing system derives the distance to the object 14 based on the received light beam for automatically performing focusing of the main lens system 16 onto the object. In order to detect the light beam reflected from the object 14, the automatic focusing system includes a photosensing element 40. The light beam received through the main lens system 16 is deflected by a half-mirror 42 and irradiated on to the photosensing element 40 through a condenser lens 44 and a filter 46 as object detecting light $L_{DET}$. The photosensing element 40 produces a distance indicative signal $S_{out}$ indicating the distance from the camera 10 to the object 14 based on the object detecting light irradiated through the filter 46 in per se well known manner. The distance indicative signal $S_{out}$ is fed to a driver circuit 48 to drive a focusing servo motor 50. The focusing servo motor 50 drives a drive gear 52 in response to the drive signal from the driver circuit 48. The drive gear 52 engages with rack teeth 54 formed on the outer periphery of the annular barrel 22 for driving the latter to shift the focusing lens 20 to a position corresponding to the measured distance.

The electronic still camera of FIG. 1 is futher provided with a stroboscopic lamp 56 and an auxiliary light emitting element 58. The stroboscopic lamp 56 and the auxiliary light emitting element 58 are associated with a switch 60 to be activated while the switch is in the ON position. As is well known, the stroboscopic lamp 56 is operated to flash in synchronism activation of the latter to emit an auxiliary light beam $L_{SB}$. So as to control activation timing of the stroboscopic lamp 56 and the auxiliary light emitting element 58, the system controller 30 is connected to power switches 62 and 64 for the stroboscopic lamp 56 and the auxiliary light emitting element 58. The system controller 30 is also connected to the switch 60.

Therefore, while the switch 60 is set at an ON position, the system controller 30 turns On the power switch 64 to activate the auxiliary light emitting element 58 for a given period of time, in response to depression of the shutter button 32. After expiration of the given period, the system controller 30 turns the power switch 62 ON to activate the stroboscopic lamp 56 to flash. At the same time, the system controller 30 drives the shutter 34 for opening to pick up the image of the object.

Figure 3:
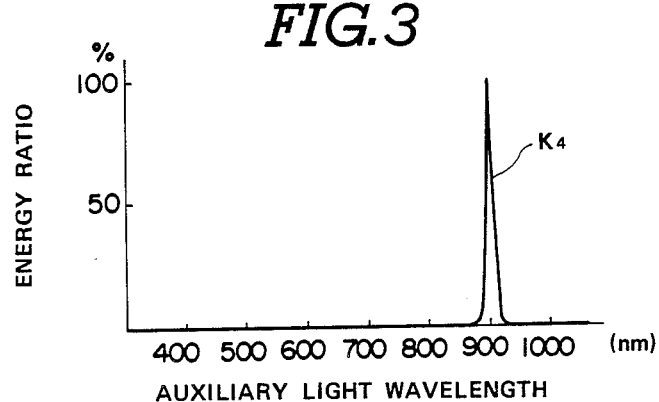
FIG. 3 is a graph showing light generation characteristics of an auxiliary light generating element employed in the shown embodiment of the automatic focusing system.
Figure 4:
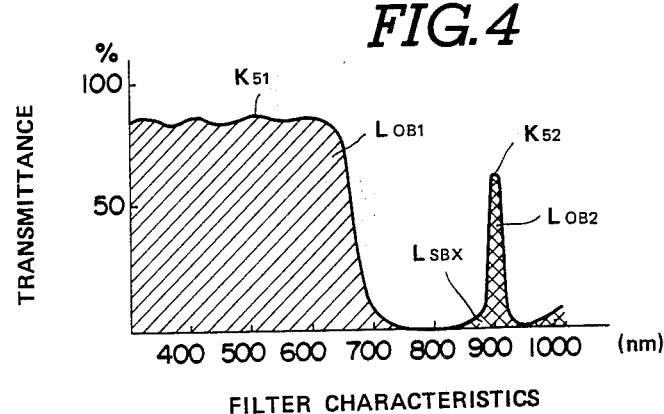
FIG. 4 is a graph showing a filtering effect of the filters employed in the automatic focusing system of FIG. 1.

In the preferred embodiment, an auxiliary light emitting element 58 that emits light having a peak frequency in the infrared light frequency range, e.g. 890 nm to 900 nm, as shown in FIG. 3 is used. Therefore, the auxiliary light beam $L_{SB}$ irradiated from the auxiliary light emitting element 58 to the object 14 is in the infrared range.

In practice, the auxiliary light emitting element of the auxiliary light beam source can be selected among light beam sources generating any frequency range of light. However, the light emitting element which consumes relatively high power are impractical. Therefore, for the auxiliary light beam source, light emitting elements which consume less power, such as photo diodes and so forth, are preferred. When such low power light emitting elements are selected, the wavelength of the light beam has to be long enough to enable distance measurement by the light reflected from the object. In view of this, the infrared range, the far infrared range or yet lower frequency range of light beams are preferable. Therefore, in the shown embodiment, an auxiliary light emitting element having the light emitting characteristics shown in FIG. 3 is selected. The light emitted by the auxiliary light emitting element has a peak at approximately 890 nm to 900 nm in the infrared frequency range.

On the other hand, in passive type automatic focusing systems, such as TTL systems, it is preferable to utilize the visible light reflected from the object. For this purpose, the automatic focusing system is preferably formulated not to react outside the visible spectrum. On the other hand, if the automatic focusing system is set to be reactive upon the light in the infrared or far infrared light range, focusing error may occur due to error in measurement of the distance to the object when a bright object is to be focused on.

Figure 5:
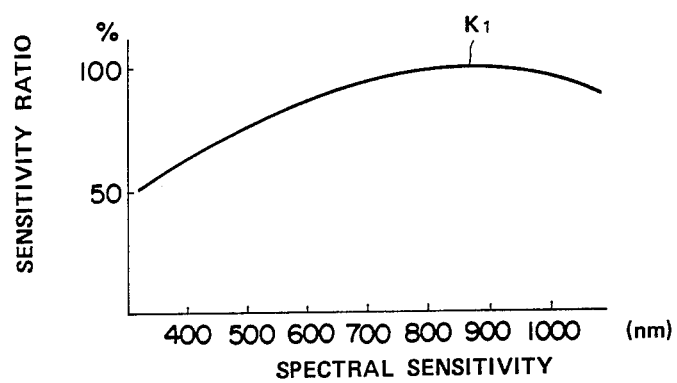
FIG. 5 is graph showing a spectral sensitivity characteristics of a photosensing element to be employed in the preferred embodiment of the automatic focusing system of FIG. 1.
Figure 6:
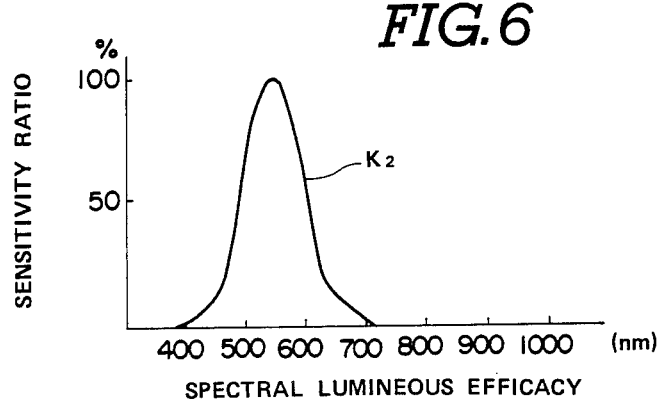
FIG. 6 is graph showing a luminous efficiency characteristics of the electronic still camera, to which the preferred embodiment of the automatic focusing system is employed.

Namely, the passive type automatic focusing systems generally employ CCDs or silicon photo diodes (SPDs) as the photosensing elements which serve as distance sensors. Such distance sensors generally are most sensitive to light at the wavelength of about 900 nm, as represented by region $K_1$ in FIG. 5. The human eye on the other hand is sensitive to light of the 400 nm to 700 nm wavelength range as represented by the region $K_2$ in FIG. 6. Therefore, when light of wavelengths longer than the $K_2$ range is received through the main lens system from background of the object, the photosensing element in the automatic focusing system tends to react to the longer wavelength light to measure the distance at which to focus the main lens and the system becomes focused upon the background.

Figure 7:
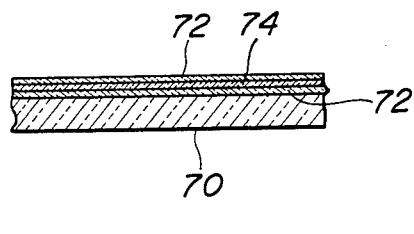
FIG. 7 is cross section of a filter element employed in the present invention.

In order to prevent the automatic focusing system from focusing upon the background, a filter 46 of the shown embodiment of the automatic focusing system having filtering characteristics $K_3$ as shown in FIG. 7 is selected. That is, the selected filter passes light of the visible spectrum and above as shown by the curve $K_{51}$ and also passes infrared light in a narrow range corresponding to the light frequency $K_4$ of the auxiliary light beam $L_{SB}$ emitted by the emitting element 58 as can be seen by curve $K_{52}$. The transfer efficiency peak of the filter in the $K_{52}$ range is provided to enable the photosensing element 40 to receive enough light energy to produce a sufficient level of distance indicative signal $S_{out}$ in response to the auxiliary light beam reflected by the object.

Figure 8:
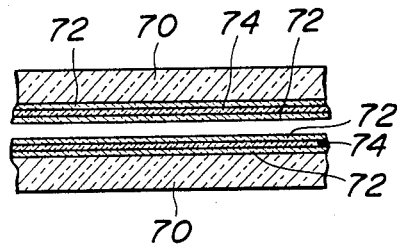
FIG. 8 is a cross sectional view of the filter elements arranged in accordance with one embodiment of the invention.

In the preferred embodiment, the filter 46 takes the form of an interference layer type filter. For instance, as shown in FIGS. 7 and 8, the filter 46 comprises a transparent base 70 made of glass, high refraction index layers 72 and low refraction layers 74. As will be seen from FIG. 8, the high refraction index layers 72 and the low refraction index layers 74 are formed on the base 70 in alternating fashion by way of deposition. The material for forming the high refraction index layer is selected among $ZnS$, $TiO_2$, $ZnO_2$, $CeO_3$ and so forth. On the other hand, a material for the low refraction index layer 74 is selected among $MgF_2$, $AlO_3$ and so forth. The thicknesses of the high and low refraction layers 72 and 74 are selected to pass monocolor light. In the shown embodiment, the filter 46 is formed by two interference layer type filters, each of which is formed by depositing ZnS layers (n=2.35) as the high refraction index layers and $MgF_2$ layer (n=1.38) as the low refraction index layer on the glass base (n=1.52) as shown in FIG. 8.

By providing the aforementioned filter characteristics, the filter 46 in the shown embodiment of the automatic focusing system, passes the light in the $K_{52}$ range wavelength for the presence of the filter characteristics of $K_{51}$. Therefore, in the bright environmental condition, the light beam reflected by the object and in the wavelength of the $K_2$ range is received by the photosensing element 58 for derivation of the distance to the object. On the other hand, when the auxiliary light emitting element 40 is used in dark environmental conditions, the reflected light component in the $K_{52}$ range passes the filter 46 to irradiate onto the photosensing element 40 as the object detecting light $L_{DET}$.

In the operation of the aforementioned electronic still camera, the switch 60 remains OFF to deactivate the stroboscopic lamp 56 when the picture is taken of a bright object or in bright environmental conditions. Therefore, the auxiliary light emitting element 58 remains inactive. Under these conditions, when the shutter button 32 is depressed, the system controller 30 becomes active to synchronously operate the shutter 34, the recording circuit 24 and the disk drive motor 28. Therefore, the shutter 34 opens to expose the image pick-up device 18 through the main lens system 16 and the half mirror 42. As a result, a major part of the light beam passes through the half mirror and irradiates onto the image pick-up device 18. On the of the hand, the deflected component of the light beam passes through the condenser lens 44 and the filter 46 to irradiate on the photosensing element 58 to serve as the object detecting light $L_{DET}$. At this time, since the filter 46 passes the light components having wavelengths in the ranges of $K_{51}$ and $K_{52}$, the light components of the wavelengths in the $K_{51}$ and $K_{52}$ ranges are irradiated onto the photosensing element. At this time, since the transmitted light curve $K_{51}$ has a substantially wider peak range and higher transfer efficiency than the $K_{52}$ range, the effective energy of the $K_{51}$ range component is much greater than that in the $K_{52}$ range. Therefore, the photosensing element 58 derives the distance between the camera and the object based on the $K_{51}$ range component of the object detecting light $L_{DET}$ to produce the distance indicative signal $S_{out}$. The driver circuit 48 is responsive to the distance indicative signal $S_{out}$ from the photosensing element 58 to drive the focus servo motor 50 for driving the annular barrel 22 through the drive gear 52 to shift the focusing lens 20 to the position where the main lens system 16 can be focused upon the object. At this time, though the photosensing element 58 receives a narrow band width of infrared light in the wavelength range of $K_{52}$, the photosensing element 58 will never derive the distance based on the $K_{52}$ range light component since the light energy of the light component in the $K_{52}$ range is much smaller than that of the light component in the $K_{51}$ range.

On the other hand, when the picture is to be taken of a dark object or in dark environmental conditions, the switch 60 is turned ON to enable the stroboscopic lamp 56 and the auxiliary light emitting element 58 to operate. At this condition, the system controller 30 is responsive to depression of the shutter button 34 to excite the auxiliary light emitting element 58. At the same time, the system controller 30 drives the shutter 34 to open. Therefore, the auxiliary light beam $L_{OB}$ reflected by the object irradiates on the image pick-up device 16 and the photosensing element 40. At this time, since the reflected light beam $L_{OB}$ contains a small magnitude of or substantially no $K_{51}$ wavelength range component, the object detecting light $L_{DET}$ to be irradiated onto the photosensing element 40 through the condenser lens 44 and the filter 46 has a substantially high proportion of $K_{52}$ range component. Therefore, at this time, the photosensing element 40 becomes responsive to the $K_{52}$ range component to derive the distance from the camera to the object to produce the distance indicative signal to cause the driver circuit 48 to shift the focusing lens 20 at the position focusing the main lens system 16 upon the object. Thereafter, the stroboscopic lamp 56 is energized to flash stroboscopic light to illuminate the object and the background thereof.

Therefore, as will be appreciated herefrom, the automatic focusing system according to the invention, enables the passive type automatic focusing system to automatically focus the main lens system of the camera upon the object even in the darkest environmental conditions without causing focusing error in bright environmental conditions.

Though the preferred embodiment of the present invention has been disclosed hereabove in terms of an automatic focusing operation for the electronic still camera, it is of course possible to apply the disclosed automatic focusing system for the usual or normal type of camera which forms a picture on a silver salt film. Furthermore, the present invention is applicable not only for the TTL type passive focusing system but also any type of passive focusing system. For instance, the invention will be applicable for automatic focusing systems which perform measurement of the distance between the camera and the object utilizing the light received not through the main lens system but through externally provided distance monitoring optical systems.

What is claimed is:

1. An automatic focusing system for a camera comprising:
    a photosensing means for receiving light reflected from an object;
    a light source for irradiating light of a narrow frequency range outside the range of human vision onto the object; and
    a filter disposed in a light path between said object, and said photosensing means said filter having a first pass-band corresponding to the visible spectrum and a second pass-band corresponding to the wavelength range of said light so that light of frequencies other than those defined within said first and second pass-bands impinging upon said filter is always attenuated by said filter to a greater degree than light within the ranges defined within said first and second pass bands.

2. An automatic focusing system as set forth in claim 1, wherein said filter comprises layers of filtering material arranged sequentially with regard to said light path.

3. An automatic focusing system as set forth in claim 2, wherein said layers are formed on a single substrate.

4. An automatic focusing system as set forth in claim 1, wherein said photosensing means produces a signal based on light reflected from said object by which signal the distance to said object can be derived.

5. An optical instrument comprising a filter having a first pass-band corresponding to the visible spectrum and a second pass-band at a frequency outside of the visible spectrum, said filter always attenuating light impinging thereon that is of frequencies outside the ranges defined by said first and second pass-bands to a substantially greater degree than that within the ranges defined by said first and second pass bands.

6. An optical instrument as set forth in claim 5 further comprising a first light source for irradiating light of a frequency substantially corresponding to that of said second-pass band onto an object.

7. An optical instrument as set forth in claim 6, wherein a first light sensing means is provided and said filter is arranged in a light path between said object and said first light sensing means.

8. An optical instrument as set forth in claim 7, further comprising a second light sensing means for sensing the ambient light intensity and producing a signal indicative thereof and wherein said first light source is active when said ambient light intensity signal indicates that the ambient light level is below a predetermined level and said first light source is inactive when said ambient light intensity is above said predetermined level.

9. An optical instrument as set forth in claim 7, wherein said first light sensing means is operable for producing a range signal in accordance with sensed light received from said object for determining the distance of said object from said instrument.

10. An optical instrument as set forth in claim 9, wherein a lens is provided, the position of which lens may be adjusted in accordance with said range signal.

11. An optical instrument as set forth in claim 8, wherein said first sensing means is operable for producing a range signal in accordance with sensed light received from said object for determining the distance of said object from said instrument.

12. An optical instrument as set forth in claim 11, wherein a lens is provided, the position of which may be adjusted in accordance with said range signal.

13. An optical instrument as set forth in claim 12, wherein a servo system is provided in association with said lens for automatically adjusting the position of said lens in accordance with said range signal.

14. An optical instrument as set forth in claim 13, wherein an image recording means is provided for recording an image obtained through said lens.

15. An optical instrument as set forth in claim 14, wherein a second light source is provided for illuminating said object so that said image recording means can record an image in accordance with light from said second light source reflected from said object and focused by said lens.

16. An optical instrument as set forth in claim 11, wherein said second light source becomes active for illuminating said object when the ambient light level, as indicated by said signal from said second light sensing means, is below a second predetermined level and is inactive while the ambient light level is greater than said second predetermined level and wherein said first and second predetermined levels may be the same.

17. An optical instrument as set forth in claim 5, wherein said filter is comprised of layers of filter material sequentially arranged with regard to said light path.

18. An optical instrument as set forth in claim 17, wherein said layers of light filtering material are formed on a single substrate.

19. An optical instrument as set forth in claim 17, wherein said filter comprises a transparent substrate having a first refraction index, a first layer formed on said substrate having a second refraction index and a second layer formed on said substrate having a third refraction index.

20. An optical instrument as set forth in claim 17, wherein said filtering layers are formed by way of vapor deposition.

21. An optical instrument as set forth in claim 17, wherein means are provided for dividing said light reflected from said object and passing through said lens into a first component directed through said filter toward said first light sensing means and a second component directed toward and focusing upon said image recording means.

22. An optical instrument as set forth in claim 17, wherein said filter is a non-movable member.

23. An auto-focus camera comprising:
first light sensing means operable for producing a range signal for deriving the range of an object on the basis of light received therefrom;
a leans, movable for focusing the camera upon the object on the basis of the signal produced by said first light sensing means;
splitting means for dividing light from said object into a first component directed toward said light sensing means and a second component focused upon an image recording means;
a filter disposed in the light path from said object to said sensing means, said filter having a first pass band corresponding to the frequency range of light defined by the human visible spectrum and a second pass band defining a narrow frequency range which narrow frequency range is below the range of human vision; and
a first light source for irradiating light of a frequency band which essentially corresponds to that defined within said second pass band, onto said object so that said first light sensing means can derive said range signal on the basis of light reflected from said object and impinging upon said sensing means.

24. An auto-focus camera as set forth in claim 23, wherein a second light sensing means is provided for sensing the ambient light level and producing a signal indicative thereof and wherein said first light source becomes active while said second sensing means indicates that the ambient light level is lower than a predetermined level.

25. An auto-focus camera as set forth in claim 24, wherein a second light source is provided for emitting light of visible frequencies for irradiating said object while said second light sensing means indicates that the ambient light is below a second predetermined level and wherein said first and predetermined levels can be the same.

26. An auto-focus camera as set forth in claim 25, wherein a servo is provided in association with said lens for adjusting the focusing position of said lens in accordance with said range signal.

27. An auto-focus camera as set forth in claim 26, further including a button, actuation of which causes:
said second light sensing means to become active for producing said ambient light level indicative signal,
said first light source to emit light or remain inactive in accordance with said ambient light level indicative signal,
said first light sensing means to produce said range indicative signal,
a servo provided in association with said lens to drive said lens to a focusing position determined in accordance with said range indicative signal,
said second light source to emit light or remain inactive on the basis of said ambient light level indicative signal, and
an image recording means to become active for recording an image of said object on the basis of light from said object focused by said lens and incident upon said image recording means.

28. An auto-focus camera as set forth in claim 26, wherein said image recording means comprises a charge coupling device operable for translating said image into an electronic signal.

29. An auto-focus camera as set forth in claim 28, wherein said electronic signal is recorded on a magnetic medium.

30. An auto-focus camera as set forth in claim 29, wherein said magnetic medium is a disc and wherein said disc is driven to rotate in contact with a magnetic recording head by a disc drive.

* * * * *